United States Patent [19]

Glenn et al.

[11] Patent Number: 4,681,602
[45] Date of Patent: Jul. 21, 1987

[54] INTEGRATED SYSTEM FOR GENERATING INERT GAS AND BREATHING GAS ON AIRCRAFT

[75] Inventors: Gary S. Glenn, Seattle; Vinod K. Rajpaul, Bellevue; Roger F. Yurczyk, Kent, all of Wash.

[73] Assignee: The Boeing Company, Seattle, Wash.

[21] Appl. No.: 685,397

[22] Filed: Dec. 24, 1984

[51] Int. Cl.[4] ........................ B01D 53/04; B01D 53/22
[52] U.S. Cl. ................................. 55/21; 55/16; 55/68; 55/75; 55/158; 55/179; 55/389
[58] Field of Search ................. 55/16, 18, 20, 21, 25, 55/26, 33, 58, 62, 68, 75, 158, 179, 389

[56] References Cited

U.S. PATENT DOCUMENTS

| | | | |
|---|---|---|---|
| 3,102,013 | 8/1963 | Skarstrom | 55/31 |
| 3,149,934 | 9/1964 | Martin | 55/58 |
| 3,150,942 | 9/1964 | Vasan | 55/31 |
| 3,406,014 | 10/1968 | Guerrieri | 23/221 |
| 3,796,022 | 3/1974 | Simonet et al. | 55/25 |
| 3,880,616 | 4/1975 | Myers et al. | 55/62 |
| 3,891,411 | 6/1975 | Meyer | 55/26 |
| 3,922,149 | 11/1975 | Ruder et al. | 55/21 |
| 3,930,813 | 1/1976 | Gessner | 55/16 |
| 3,930,814 | 1/1976 | Gessner | 55/21 X |
| 3,957,463 | 5/1976 | Drissel et al. | 55/25 |
| 4,011,065 | 3/1977 | Münzner et al. | 55/25 |
| 4,026,680 | 5/1977 | Collins | 55/26 |
| 4,174,955 | 11/1979 | Blackmer et al. | 55/16 X |
| 4,190,424 | 2/1980 | Armond et al. | 55/68 X |
| 4,198,213 | 4/1980 | Mannatt | 55/16 |
| 4,272,265 | 6/1981 | Snyder | 55/389 |
| 4,287,170 | 9/1981 | Erickson | 423/579 |
| 4,322,228 | 3/1982 | Myers et al. | 55/163 |
| 4,349,357 | 9/1982 | Russell | 55/21 |
| 4,386,945 | 6/1983 | Gardner | 55/26 |
| 4,428,372 | 1/1984 | Beysel et al. | 55/21 X |
| 4,431,432 | 2/1984 | Amitani et al. | 55/26 |
| 4,448,592 | 5/1984 | Linde | 55/68 |
| 4,449,990 | 5/1984 | Tedford, Jr. | 55/33 X |
| 4,474,586 | 10/1984 | Rice | 55/16 |
| 4,508,548 | 4/1985 | Manatt | 55/16 X |
| 4,529,412 | 7/1985 | Hayashi et al. | 55/25 |

Primary Examiner—Robert Spitzer
Attorney, Agent, or Firm—Joan H. Pauly

[57] ABSTRACT

Improvements in oxygen generators and inert gas generators in aircraft. Separate gas generators are inefficient and thus present the problems of excess weight and heavy space and bleed air requirements. This invention provides an integrated system of generating oxygen and inert gas to pre-enrich the supply gas and increase overall efficiency. Bleed air is supplied to a first module (14) that separates it into a nitrogen enriched product gas and an oxygen enriched waste gas. The waste gas is fed into a second module (26) which separates it into an oxygen enriched product gas and a second waste gas. The modules (14, 26) may be reversed, with bleed air being fed into the oxygen generator and waste gas being fed into the inert gas generator. The system may include three modules (34, 42, 56). The waste gas from first module (34) is fed into second module (56), and the waste gas from second module (56) and the product gas from first module (34) are fed into third module (42).

8 Claims, 4 Drawing Figures

INTEGRATED SYSTEM FOR GENERATING INERT GAS AND BREATHING GAS ON AIRCRAFT

TECHNICAL FIELD

This invention relates to systems for providing inert gas and breathing gas on aircraft and, more particularly, to a method and apparatus for providing such gases through a single integrated system in which waste gas from one gas separation module is used as the supply gas for another gas separation module.

BACKGROUND ART

In aircraft, there is a need to provide a combustibly inert material for filling void space in fuel tanks to maintain a required amount of pressure in the fuel tanks and at the same time minimize any chance of fire in the fuel tanks. There is also a need to provide an oxygen-rich gas for the crew to breathe and for aircraft services that require oxygen. An example of such a service is an integrated power unit. Conventional methods for providing the inert material include placing rigid foams in the fuel tanks and providing inert gas to the fuel tanks from a storage container or containers aboard the aircraft. In the latter case, the inert gas is generated on the ground and stored in such containers in gas or liquid form. The containers are then loaded onto the aircraft and the stored fluid is used as required. The containers must be replenished between flights. The conventional approach to providing a source of oxygen-rich gas is basically the same as the latter approach to providing inert material, with containers of oxygen-rich gas or liquid being loaded onto the aircraft and replenished between flights.

These conventional approaches have a number of serious disadvantages, including relatively high life cycle costs and relatively complicated maintenance requirements. In addition, the storage of expendable liquids or gases on an aircraft requires a good deal of space and adds to the weight of the aircraft, thus reducing the overall efficiency of the aircraft. The storage of high pressure gaseous oxygen or liquid oxygen also presents a high risk of combustion is a leak occurs and there is any combustible material nearby.

The need to avoid the disadvantages associated with conventional approaches has led to an interest in on-board generation of combustibly inert gases and on-board generation of oxygen-rich gas. To date, the generating systems that have been proposed and/or put into practice either generate only one of the required inert gas and oxygen-rich gas or generate such gases separately. Combustibly inert gas is produced by processing engine bleed air with an inert gas generator which is a gas separation module based on either a selectively permeable membrane or a molecular sieve. The system for on-board generation of oxygen-rich gas usually process engine bleed air with an on-board oxygen gas generator which is based on a molecular sieve.

The major problem with the permeable membrane and molecular sieve gas separation modules is that they do not operate very efficiently, especially when they are required to yield a high purity product gas. Efficiency is defined as the ratio of the product gas to the supply gas. Oxygen generating systems generally have an efficiency of 2% to 10%, and inert gas generating systems generally have an efficiency of 20% to 40%. These relatively low efficiencies require the generating means to be relatively large and heavy in order to deliver the necessary product flow rates. In addition, a relatively large amount of bleed air must be supplied to the units to obtain the necessary amount of product gas. A major portion of the supply bleed air ends up being discarded as waste gas. The problems of increased weight, increased space requirements, and increased bleed air demands are especially troublesome in modern fighter aircraft. In such aircraft, even small increases in weight are significant, space limitations are particularly severe, and engine performance is particularly sensitive to removal of bleed air to other portions of the aircraft.

The patent literature includes a fairly large number of systems for processing a supply gas having two or more components to obtain a product gas enriched in one of such components. Each of the following United States patents discloses a system in which a molecular sieve or sieves are used to obtain an oxygen-rich product gas and/or a nitrogen-rich product gas from air: U.S. Pat. No. 3,102,013, granted Aug. 27, 1963, to C. W. Skarstrom; U.S. Pat. No, 3,796,022, granted Mar. 12, 1974, to G. Simonet et al; U.S. Pat. No. 3,880,616, granted Apr. 29, 1975, to W. P. Myers et al; U.S. Pat. No. 3,957,463, granted May 18, 1976, to G. M. Drissel el al; U.S. Pat. No. 4,011,065, granted Mar. 8, 1977, to H. Munzner et al; U.S. Pat No. 4,026,680, granted May 31, 1977, to J. J. Collins; U.S. Pat. No. 4,272,265, granted June 9, 1981, to F. P. Snyder; U.S. Pat. No 4,322,228, granted Mar. 30, 1982, to W. P. Myers et al; U.S. Pat. No. 4,349,357, granted Sept. 14, 1982, to G. K. Russell; U.S. Pat. No. 4,386,945, granted June 7, 1983, to P. J. Gardner; and U.S. Pat. No. 4,431,432, granted Feb. 14, 1984, to T. Amitani el al.

In the system described in the Gardner patent, two parallel columns of gas absorbent beds are provided. Each column includes a nitrogen selective molecular sieve, an oxygen selective molecular sieve and a plenum. Air from a compressor is simultaneously fed into each of the sieves in one of the columns. A portion of the product flowing through the oxygen selective molecular sieve in the column being supplied is flowed through the oxygen selective molecular sieve in the other column to desorb oxygen. The gas containing the desorbed oxygen flows out of the sieve and is stored in the plenum. When the beds of the molecular sieves in the columns being supplied are saturated, the air from the compressor is supplied to the second column and the first column goes through a desorption cycle. The air fed to the nitrogen selective molecular sieve is fed through the plenum, which contains the oxygen enriched gas obtained from the oxygen selective molecular sieve during the desorption cycle. The feeding of the compressed air through the plenum enriches the feed air supply to the nitrogen selective molecular sieve.

U.S. Pats. No. 3,149,934, granted Sept. 22, 1964, to H. Z. Martin, and 3,150,942, granted Sept. 29, 1964, to S. Vasan each disclose a system in which molecular sieves are used to obtain a hydrogen-rich product gas. U.S. Pat. Nos. 3,406,014 granted Oct. 15, 1968 to S. A. Guerrieri, and 4,287,170, granted Sept. 1, 1981, to D. C. Erickson each disclose a chemical oxidation-reduction process for separating air into oxygen and nitrogen. U.S. Pat. No. 3,891,411, granted June 24, 1975, to G. M. Meyer discloses a system for extracting nitrogen from a mixture of nitrogen, carbon dioxide, and water on board a ship.

The systems described above and the systems disclosed in the above-cited patents, as well as the prior art cited in such patents, should be carefully considered for the purpose of putting the present invention into proper perspective relative to the prior art.

DISCLOSURE OF THE INVENTION

A subject of this invention is a method of generating oxygen enriched gas and combustibly inert gas from bleed air in an aircraft. According to an aspect of the invention, the method comprises providing first and second gas separation modules. Bleed air having an oxygen component and a nitrogen component is supplied to the first module. In the first module, the bleed air is separated into a first product gas enriched in one of said components, and a first waste gas enriched in the other of said components. The first waste gas is transported to the second module. In the second module, the first waste gas is separated into a second product gas further enriched in said other of said components, and a second waste gas. It should be noted that the term "bleed air", as used herein, includes engine bleed air, bleed air from the aircraft's environmental control system, and air from any other source on board the aircraft.

According to another aspect of the invention, the method further comprises providing a third gas separation module. The first product gas and the second waste gas are transported to the third module. In the third module, the first product gas and the second waste gas are separated into a third product gas further enriched in said one component, and a third waste gas. Embodiments of the method of the invention that include the feature of providing a third gas separation module and operating such module as described in this paragraph, have the advantage of providing improved efficiency levels in both the generation of oxygen enriched gas and the generation of combustibly inert gas (i.e. nitrogen enriched gas) from bleed air.

Another subject of the invention is a system of generating oxygen enriched gas and combustibly inert gas from bleed air in an aircraft. According to an aspect of the invention, the system comprises supply means for supplying bleed air having an oxygen component and a nitrogen component to the system. The system also includes a first gas separation module and a second gas separation module. The first gas separation module is for receiving the bleed air supplied by the supply means and separating said bleed air into a first product gas enriched in one of said components, and a first waste gas enriched in the other of said components. Conduit means is provided for transporting the first waste gas out of the first module. The second gas separation module is for receiving the first waste gas from the conduit means and separating said waste gas into a second product gas further enriched in said other of said components, and a second waste gas.

According to another aspect of the system of the invention, the system further comprises first and second transport means and a third gas separation module. The first transport means transports the first product gas out of the first module. The second transport means transports the second waste gas out of the second module. The third gas separation module receives the first product gas from the first transport means and the second waste gas from the second transport means and separates the first product gas and the second waste gas into a third product gas further enriched in said one component, and a third waste gas.

The method and system of the invention solve the problems discussed above in connection with conventional means for providing inert material for inerting fuel tanks, and for providing oxygen-rich gas for the crew and other aircraft systems requiring oxygen. In addition, the method and system of the invention solve the problem of the low efficiency of currently used and proposed separate permeable membrane and molecular sieve gas separation modules. By using the waste gas produced by a first module to feed a second module, the method and system of the invention provide a significantly increased efficiency of the second module. This increased efficiency permits the alleviation of the problems of weight, space requirements, and bleed air requirements associated with previous systems. With increased efficiency, the second module may be scaled down in weight and size and/or the process gas pressure or flow requirement may be reduced. The particular way in which the benefit of the increased efficiency is applied depends on the specific needs of a particular aircraft. Methods and systems of the invention including a third gas separation modules but provide the benefit of increased efficiency levels in the generation of both oxygen enriched gas and combustibly inert gas. The choice between two modules or three modules is again dictated by the specific requirements of a particular aircraft.

The advantages and features discussed above, as well as other advantages and features, will become apparent from the detailed description of the Best Modes for Carrying Out the Invention that follows.

BRIEF DESCRIPTION OF THE DRAWINGS

In the drawings, like element designations refer to like parts throughout, and.

BEST MODES FOR CARRYING OUT THE INVENTION

Figure 1:
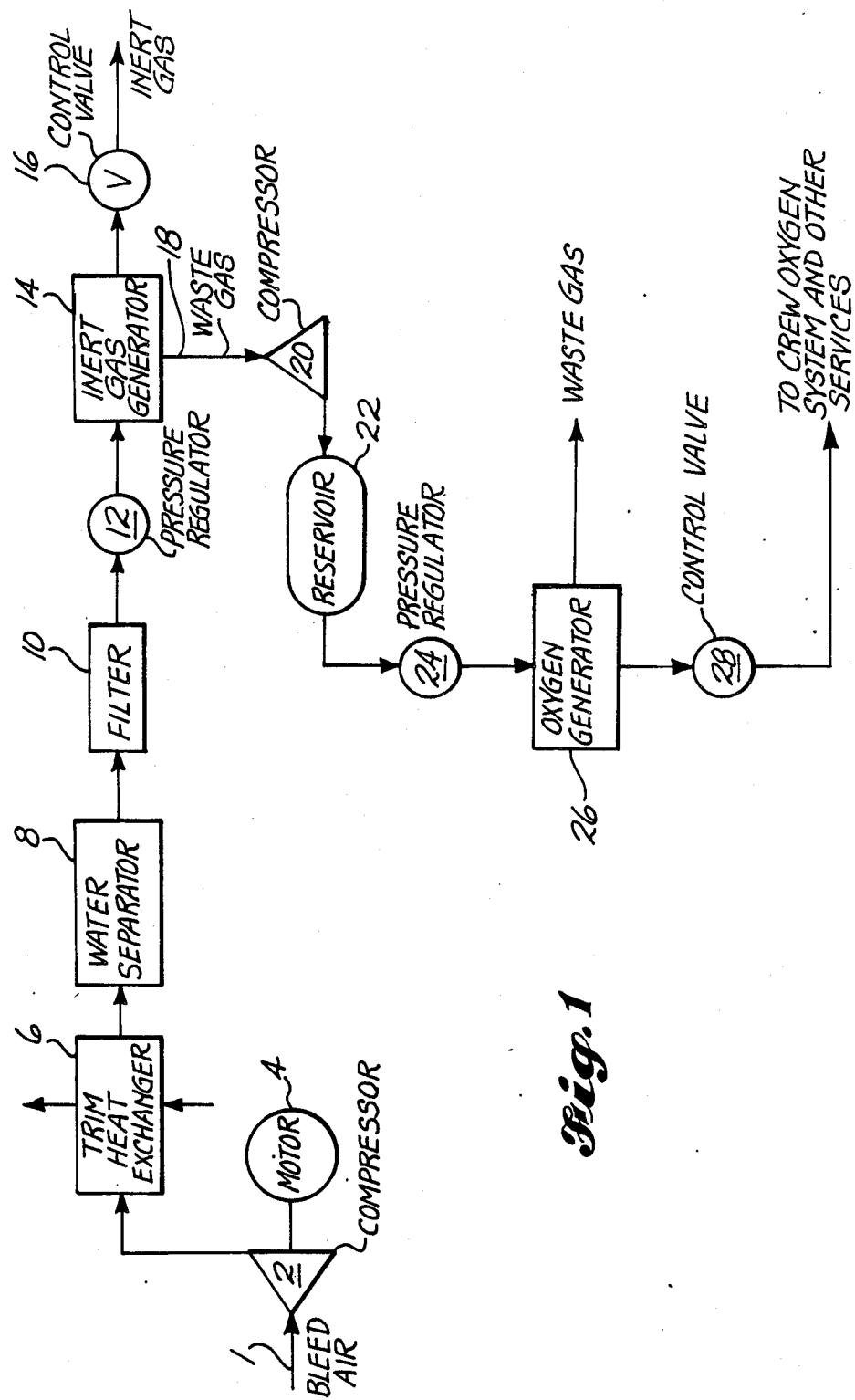
FIG. 1 is a schematic view of the first preferred embodiment of the system of the invention.

The drawings illustrate two gas generating systems that are constructed according to the invention and that also constitute the best modes of the system of the invention currently known to the applicant. The drawings also illustrate the best modes for carrying out the method of the invention currently known to the applicant. The systems shown in the drawings are intended primarily for use in military fighter aircraft. It is anticipated that the primary application of the system and method of the invention will be in such aircraft. However, it is of course to be understood that the method and system of the invention may also be used to advantage in a variety of other types of aircraft.

The gas generating system of the invention is characterized by first and second gas separation modules, one of which generates oxygen enriched gas and the other of which generates combustibly inert gas; i.e., nitrogen enriched gas. Bleed air is supplied to the gas generating system from the aircraft bleed air system or from the aircraft environmental control system. The bleed air consists primarily of an oxygen component and a nitrogen component. The bleed air is received into the first gas separation module where it is separated into a product gas enriched in one of the two components of oxygen and nitrogen, and a waste gas enriched in the other of such components. The waste gas is transported through a conduit out of the first module and is received into the second gas separation module. In the second module, the supply waste gas is separated into another product gas that is further enriched in the same component that the supply waste gas was enriched in, and a second waste gas.

In each of the preferred embodiments of the system of the invention shown in the drawings, the first gas separation module produces a product gas that is enriched in nitrogen and a waste gas that is enriched in oxygen, and the second module produces a product gas that is enriched in oxygen. This arrangement of flowing bleed air through an inert gas generator and then flowing the enriched waste gas from the inert gas generator through an oxygen gas generator is the preferred arrangement for systems in most military fighter aircraft. It is of course to be understood that the order of the generators may be reversed, with the bleed air being fed into an oxygen gas generator and the enriched waste gas from the oxygen gas generator being fed into an inert gas generator, without departing from the spirit and scope of the invention. For example, in an aircraft, such as a large cargo aircraft, in which there are less demanding maneuver requirements and relatively large crews, it would be preferable to have the bleed air fed into an oxygen gas generator and the waste gas fed into an inert gas generator.

The first preferred embodiment of the system of the invention is shown in FIG. 1. This embodiment includes a single inert gas generating module 14 and a single oxygen gas generating module 26. Bleed air is supplied to the system through a conduit 1 from the aircraft bleed air system or environmental control system. The bleed air is first fed into a compressor 2 which boosts the bleed air to the higher working pressure required by the module 14. The compressor 2 is powered by a motor 4. The air moves from the compressor 2 to a trim heat exchanger 6 where the temperature of the air is lowered. The air moves from the heat exchanger 6 to a water separater 8. The separater 8 may be of various types, such as a scupper type. From the water separater 8, the air proceeds to a filter 10. The filter 10 removes particulate contaminants in the air, such as solid particles and oil droplets. The water separater 8 and filter 10 enhance the quality of the process air before it is supplied to the inert gas generator 14.

The process air is moved from the filter 10 through a pressure regulator 12 into the inert gas generator 14. The pressure regulator 12 serves to limit the maximum supply pressure to the inert gas generator 14. In the inert gas generator 14, the air is separated into a nitrogen enriched product gas and an oxygen enriched waste gas. The quantity and quality of flow of the product gas is controlled by a control valve 16 and the regulator 12. The valve 16 may take a variety of forms. In many applications, an outflow of product gas at a fixed rate is desired, and therefore, a control valve in the form of a restriction in the product gas conduit that has a fixed orifice is the preferred form for the valve 16. Such a restriction has the advantages of being very simple and of requiring little, if any, maintenance.

The oxygen enriched waste gas leaves the inert gas generator 14 through a separate conduit 18. Preferably, the conduit 18 leads to a compressor 20 which boosts the pressure of the waste gas to the working level required by the oxygen generator 26, for example about 50 psig. The provision of the compressor 20 permits the reduction of the pressure of the waste gas as it leaves the inert gas generator 14. From the compressor 20, the inert gas generator waste gas is fed into a reservoir 22. The reservoir 22 is required primarily if the inert gas generator 14 is of the molecular sieve type. In such case, the reservoir 22 serves to smooth out the pressure peaks created by the operation of the inert gas generator 14. If the generator 14 is of the permeable membrane type, whether or not a reservoir is required depends primarily on the type of compressor 20 used. For example, if the compressor 20 is of the piston type, a reservoir 22 would be needed to smooth out any surges in pressure. In any case, the reservoir may also function to ensure the availability of oxygen at all times during a flight.

From the reservoir 22, the oxygen enriched gas is fed through a pressure regulator 24 into the oxygen generator 26. The generator 26 separates the gas supplied to it into a product gas that is further enriched in oxygen and a waste gas. The waste gas is discarded. The product gas is supplied through a conduit to the crew oxygen system for breathing and to other aircraft services requiring oxygen. The conduit for the product gas includes a control valve 28. The control valve 28 and pressure regulator 24 control the operation of the oxygen generator 26 in the same manner that the control valve 16 and regulator 12 control the operation of the inert gas generator 14.

In the system shown in FIG. 1, both the inert gas generator 14 and the oxygen gas generator 26 may be either the molecular sieve type or the permeable membrane type. The product gas from the inert gas generator 14 should be 9% or less oxygen to be suitable for use for inerting fuel tanks. The purity required of the oxygen enriched gas from the oxygen gas generator varies with the particular aircraft and the flight conditions of the aircraft. For example, in a military fighter aircraft, the crew oxygen system requires a gas of 95% oxygen at very high altitudes and relatively severe maneuvering conditions, but requires a much lower percentage at lower altitudes and less severe maneuvering conditions. In order to be suitable for use in a fighter aircraft, the oxygen generator should be capable of producing a product gas that is 95% oxygen so that such gas will be available when needed.

Figure 2:
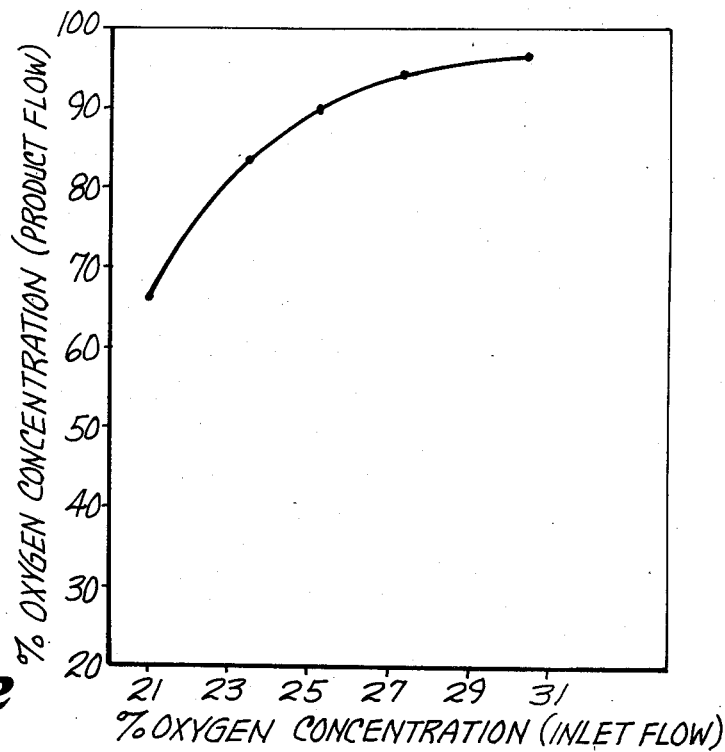
FIG. 2 is a graphical representation of the oxygen concentration of the product gas versus the oxygen concentration of the supply gas in an oxygen generating module.

FIG. 2 is a graphical illustration of the percentage of oxygen concentration in the product gas of an oxygen generator versus the oxygen concentration of the gas supplied to the generator. In the systems of the invention, the inert gas generator waste gas oxygen concentrations are typically in the range of 25% to 30%. FIG. 2 illustrates, in terms of the purity of the product gas, the advantageous result of feeding oxygen enriched waste gas from an inert gas generator into an oxygen gas generator, rather than feeding bleed air directly into the oxygen gas generator. As seen in FIG. 2, the invention provides an increase in product gas oxygen concentration from 65% to 90%–95%.

When it is desired to increase the efficiency of both the oxygen generating module and the inert gas generating module, the system of the invention may be provided with a third gas separation module. This third module receives the product gas from the first module and the waste gas from the second module and separates them into a third product gas and a third waste gas. The third module is the same type of module as the first module. In other words, the first and third modules are either both inert gas generators or both oxygen generator if the first and third generators are inert gas generators, and an inert gas generator if the first and third generators are oxygen generators. The choice of the two arrangements is determined by the specific needs of the particular aircraft.

Figure 3:
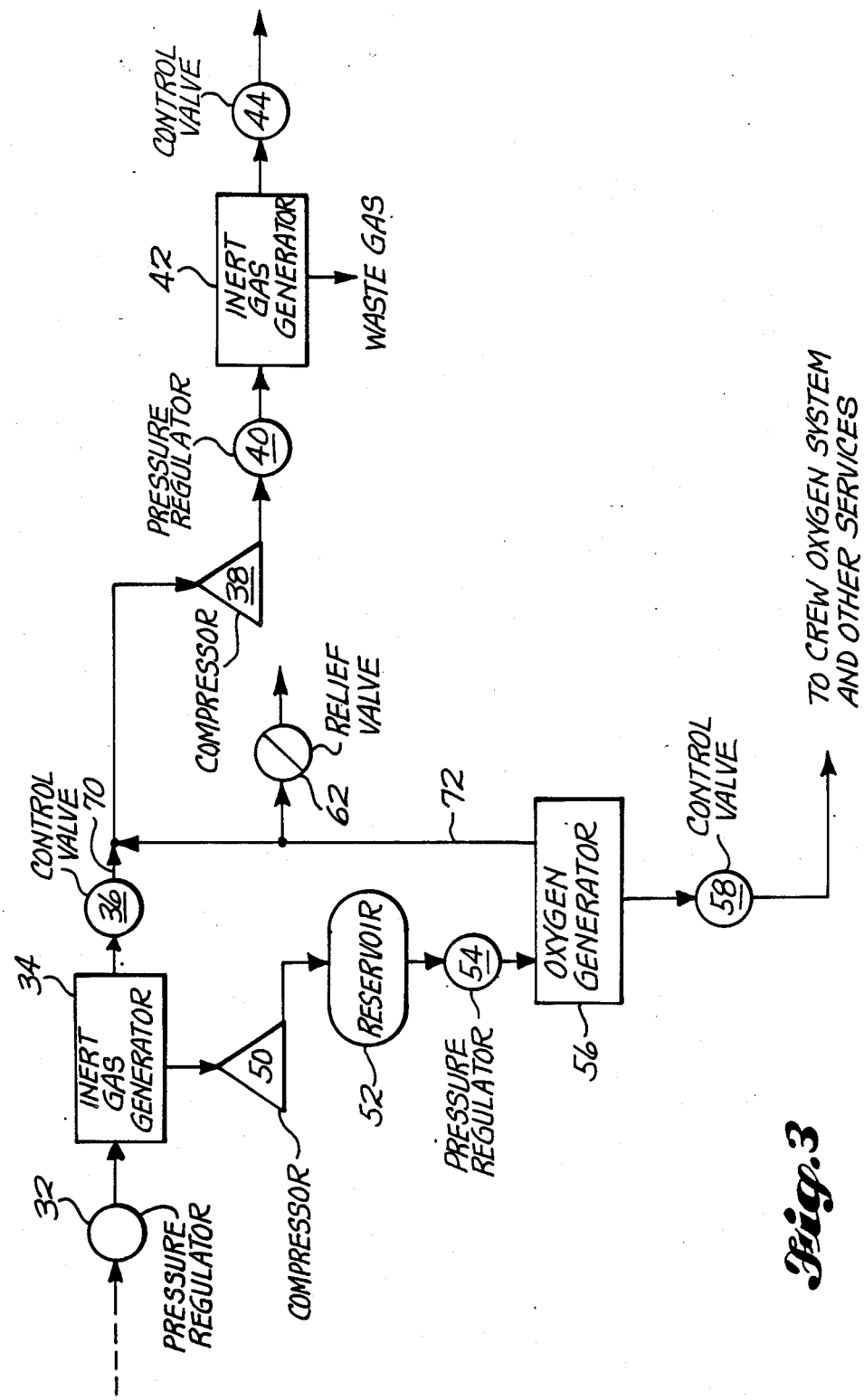
FIG. 3 is a schematic view of the second preferred embodiment of the system of the invention.

The second preferred embodiment of the system of the invention, which has three gas separation modules, is illustrated in FIG. 3. The first portion of the system is indicated on the left by a broken line leading into a pressure regulator 32. This portion of the system is the same as the first system shown in FIG. 1 and includes a supply conduit 1, a compressor 2, a motor 4, a heat exchanger 6, a water separater 8, and a filter 10. The supply air is fed from the filter 10 through the pressure regulator 32 to an inert gas generator 34. The operation of the generator 34 is controlled by a control valve 36 and the regulator 32 in the same manner that the operation of the generator 14 is controlled by valve 16 and regulator 12 in the embodiment shown in FIG. 1. In the generator 34, the supply air is separated into a nitrogen enriched product gas and an oxygen enriched waste gas. The product gas flows through the control valve 36 into a conduit 70 that leads to a second inert gas generator 42. The first inert gas generator 34 is operated at a relatively high supply pressure of 75 to 100 psig and a relatively high rate of flow of gas through the generator 34. This results in higher flow efficiencies and a product gas oxygen concentration in the range of 12% to 15%.

The waste gas from the generator 34 exits the generator 34 through a separate conduit and is fed into a compressor 50 and then into a reservoir 52. From the reservoir 52, the gas flows through a pressure regulator 54 into an oxygen generating module 56. The flow of gas through the generator 56 is controlled by a control valve 58 and the regulator 54 in the same manner that the flow through the other generators is controlled by a control valve and a regulator. The oxygen enriched product gas flows through valve 58 to the crew breathing system and other aircraft services requiring oxygen. The structure and functioning of the compressor 50, reservoir 52, regulator 54, generator 56, and valve 58 are essentially the same as the corresponding elements in the first system shown in FIG. 1.

The waste gas from the oxygen generator 56 flows out of the generator 56 through a separate conduit 72. The conduit 72 joins the conduit 70 through which the product gas from the first inert gas generator 34 flows, and the waste gas from the oxygen generator 56 and the product gas from the inert gas generator 34 are merged and transported to the second inert gas generator 42. A relief valve 62 is provided in conduit 72 to prevent back pressure on the oxygen generator 56, which would impair the performance of generator 56.

As noted above, conduit 70 carrying the product gas from generator 34 and conduit 72 carrying waste gas from generator 56 merge into a single conduit that leads to the second inert gas generator 42. This single conduit leads to a compressor 38 where the pressure of the gas is boosted to the working level required by the second inert gas generator 42. The gas moves from compressor 38 through a pressure regulator 40 to generator 42. The operation of generator 42 is controlled by a control valve 44 and regulator 40 in the same manner that valve 36 and regulator 32 control the operation of generator 34. The inert product gas leaves generator 42 through valve 44 and is delivered to the inert gas storage and distribution system. The waste gas from generator 42 is discarded.

Each of the components of the gas supplied to the generator 42 has an oxygen concentration of about 12% to 15%. This lowered oxygen concentration corresponds to an increased nitrogen concentration. The enrichment of the supply gas delivered to generator 42 increases the efficiency of generator 42. As in the case of the generators in the first embodiment shown in FIG. 1, each of the generators 34, 42, 56 in the second embodiment may be either of the molecular sieve or the permeable membrane type.

Figure 4:
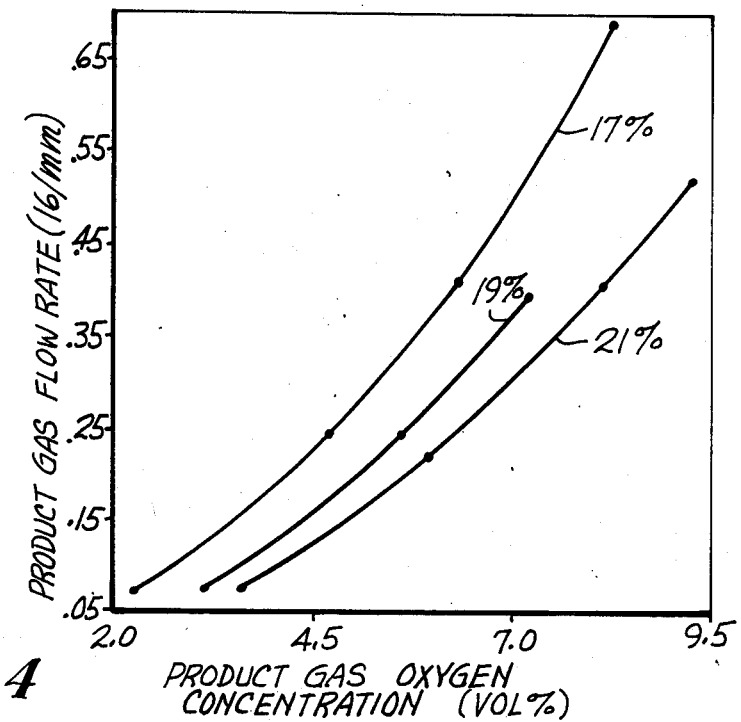
FIG. 4 is a graphical representation of product gas flow rate versus product gas oxygen concentration for three supply gas concentrations in an inert gas generating module.

FIG. 4 is a graphical representation of test results showing the product gas flow rate versus the product gas oxygen concentration for a permeable membrane inert gas generator for three different supply gas oxygen concentrations, 17%, 19%, and 21% volume, respectively. As can be seen in FIG. 4, at a constant product gas oxygen concentration of 5%, there is a 69% increase in product gas flow rate for a decrease in supply gas oxygen content from 21% to 17%. In the second preferred embodiment of the invention, the supply gas oxygen content for the second inert gas generator is in the range of 12% to 15% volume. Therefore, it is apparent that the increase in efficiency in the inert gas generating leg of the second preferred embodiment of the invention is highly significant. It should also be apparent that a significant increase in the efficiency of a single inert gas generator may be obtained in a system constucted according to the invention and having only two gas separation modules, with the bleed air being fed into the oxygen generating module and the waste gas being fed into the inert gas generating module.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. In an aircraft, a method of generating oxygen enriched gas and combustibly inert gas from bleed air, comprising:
   providing first and second gas separation modules;
   supplying bleed air having an oxygen component and a nitrogen component to the first module;
   in the first module, separating said bleed air into a first product gas enriched in one of said components, and a first waste gas enriched in the other of said components;
   transporting the first waste gas from the first module to the second module;
   boosting the pressure of the first waste gas, after it exits the first module and before it enters the second module, to a working level required by the second module; and allowing the first waste gas to exit the first module at a relatively low pressure; and
   in the second module, separating the first waste gas into a second product gas further enriched in said other of said components, and a second waste gas.

2. A method as recited in claim 1, further comprising:
providing a third gas separation module;
transporting the first product gas and the second waste gas to the third module; and
in the third module, separating the first product gas and the second waste gas into a third product gas further enriched in said one component, and a third waste gas.

3. A method as recited in claim 2, further comprising boosting the pressure of the first product gas and the second waste gas, after they exit the first and second modules, respectively, and before they enter the third module, to a working level required by the third module.

4. In an aircraft, a method of generating oxygen enriched gas and combustibly inert gas from bleed air, comprising:
providing first, second, and third gas separation modules;
supplying bleed air having an oxygen component and a nitrogen component to the first module;
in the first module, separating said bleed air into a first product gas enriched in one of said components, and a first waste gas enriched in the other of said components;
transporting the first waste gas to the second module;
in the second module, separating the first waste gas into a second product gas further enriched in said other of said components, and a second waste gas;
transporting the first product gas and the second waste gas to the third module; and
in the third module, separating the first product gas and the second waste gas into a third product gas further enriched in said one component, and a third waste gas.

5. In an aircraft, a system of generating oxygen enriched gas and combustibly inert gas from bleed air, comprising:
supply means for supplying bleed air having an oxygen component and a nitrogen component to the system;
a first gas separation module for receiving the bleed air supplied by the supply means and separating said bleed air into a first product gas enriched in one of said components, and a first waste gas enriched in the other of said components; said module having an outlet;
conduit means for transporting the first waste gas out of the first module through said outlet;
a second gas separation module for receiving the first waste gas from the conduit means and separating said waste gas into a second product gas further enriched in said other of said components, and a second waste gas; said second module having an inlet through which it receives the first waste gas; and
pressure control means for creating a pressure differential between the outlet of the first module and the inlet of the second module, to boost the pressure at said inlet to a working level required by the second module while allowing the pressure at said outlet to remain at a relatively low level.

6. A system as described in claim 5, further comprising:
first transport means for transporting the first product gas out of the first module;
second transport means for transporting the second waste gas out of the second module; and
a third gas separation module for receiving the first product gas from the first transport means and the second waste gas from the second transport means and separating the first product gas and the second waste gas into a third product gas further enriched in said one component, and a third waste gas.

7. A system as described in claim 6, further comprising second pressure control means for boosting the pressure of the first product gas and the second waste gas, after they are transported out of the first and second modules, respectively, and before they are received into the third module, to a working level required by the third module.

8. In an aircraft, a system of generating oxygen enriched gas and combustibly inert gas from bleed air, comprising:
supply means for supplying bleed air having an oxygen component and a nitrogen component to the system;
a first gas separation module for receiving the bleed air supplied by the supply means and separating said bleed air into a first product gas enriched in one of said components, and a first waste gas enriched in the other of said components;
conduit means for transporting the first waste gas out of the first module;
a second gas separation module for receiving the first waste gas from the conduit means and separating said waste gas into a second product gas further enriched in said other of said components, and a second waste gas;
first transport means for transporting the first product gas out of the first module;
second transport means for transporting the second waste gas out of the second module; and
a third gas separation module for receiving the first product gas from the first transport means and the second waste gas from the second transport means and separating the first product gas and the second waste gas into a third product gas further enriched in said one component, and a third waste gas.

* * * * *

UNITED STATES PATENT AND TRADEMARK OFFICE
CERTIFICATE OF CORRECTION

PATENT NO. : 4,681,602

DATED : July 21, 1987

INVENTOR(S) : Gary S. Glenn et al.

It is certified that error appears in the above-identified patent and that said Letters Patent are hereby corrected as shown below:

Column 1, line 44, "is" should be -- if --.

Column 4, line 22, after "separation", add -- module are more complex than systems having only two --.

Column 7, line 7, after "oxygen", add -- gas generators. The second generator is an oxygen -- .

Signed and Sealed this

Twenty-sixth Day of January, 1988

Attest:

DONALD J. QUIGG

Attesting Officer

Commissioner of Patents and Trademarks